US009155046B2

(12) United States Patent (10) Patent No.: US 9,155,046 B2
Maciocco et al. (45) Date of Patent: Oct. 6, 2015

(54) OPTIMIZING SEMI-ACTIVE WORKLOADS

(75) Inventors: Christian Maciocco, Portland, OR (US);
Sameh Gobriel, Hillsboro, OR (US);
Ren Wang, Portland, OR (US);
Tsung-Yuan C. Tai, Portland, OR (US);
Kristoffer D Fleming, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 13/612,142

(22) Filed: Sep. 12, 2012

(65) Prior Publication Data

US 2014/0071866 A1 Mar. 13, 2014

(51) Int. Cl.
*H04W 52/02* (2009.01)

(52) U.S. Cl.
CPC .................................. *H04W 52/0229* (2013.01)

(58) Field of Classification Search
CPC ...................................................... H04W 52/02
USPC .................................. 370/311, 352, 235, 217
See application file for complete search history.

(56) References Cited

U.S. PATENT DOCUMENTS

| | | | | |
|---|---|---|---|---|
| 6,122,748 A * | 9/2000 | Hobson | | 713/323 |
| 7,606,208 B2 * | 10/2009 | Benveniste | | 370/338 |
| 8,416,768 B2 * | 4/2013 | Aloni et al. | | 370/352 |
| 2006/0146769 A1 * | 7/2006 | Patel et al. | | 370/338 |
| 2007/0140199 A1 * | 6/2007 | Zhao et al. | | 370/338 |
| 2008/0233962 A1 * | 9/2008 | Hazra et al. | | 455/437 |
| 2009/0268611 A1 | 10/2009 | Persson et al. | | |
| 2010/0169683 A1 | 7/2010 | Wang et al. | | |
| 2011/0158115 A1 | 6/2011 | Sun et al. | | |
| 2011/0225440 A1 | 9/2011 | Kwon et al. | | |
| 2012/0192001 A1 * | 7/2012 | Sutardja | | 713/323 |
| 2012/0263084 A1 * | 10/2012 | Liu et al. | | 370/311 |

FOREIGN PATENT DOCUMENTS

| | | |
|---|---|---|
| KR | 102011007577 A | 7/2011 |
| WO | WO2004021627 A2 * | 3/2004 |
| WO | WO-2014043224 A1 | 3/2014 |

OTHER PUBLICATIONS

"International Application Serial No. PCT/US2013/059247, International Search Report mailed Jan. 10, 2014", 3 pgs.
"International Application Serial No. PCT/US2013/059247, Written Opinion mailed Jan. 10, 2014", 5 pgs.

* cited by examiner

*Primary Examiner* — Parth Patel
(74) *Attorney, Agent, or Firm* — Schwegman Lundberg & Woessner, P.A.

(57) ABSTRACT

Devices and methods for optimizing semi-active workloads are described herein. A network interface device may be configured to offload data packet acknowledgment responsibilities of a host platform by transmitting, to the sender of the packets, acknowledgements of packets received throughout a time duration. Upon completion of the time duration, the network interface device may trigger the host platform to perform batch processing of the data packets received during the time duration.

17 Claims, 4 Drawing Sheets

OPTIMIZING SEMI-ACTIVE WORKLOADS

TECHNICAL FIELD

Embodiments described herein relate to communications between computer systems. Some embodiments relate to network interface cards (NICs) in such systems.

BACKGROUND

Mobile device users expect and demand that mobile platforms allow for ever-increasing involvement in communication activities. Mobile platforms, therefore, offer ubiquitous network connectivity through one or more communication devices to provide mobile device users with significant communications capabilities. Mobile platform communication needs are further increased as some mobile platform activities move into the cloud. For example, as data storage activities and content retrieval activities are increasingly moved into the cloud, network communications between the mobile platform and servers within the cloud are correspondingly increased.

While a communication interface device may consume a relatively small portion of a mobile platform's power, the impact of communication activities on overall platform power requirements may nevertheless be significant because, in conventional systems, the whole platform, including for example processors, memory, and buses, is kept active to process network packets.

Further, because it may not be possible to ascertain in advance when network packets will arrive, the whole platform may need to remain active for extended periods even in the absence of network traffic. If network packets are not handled within an amount of time expected by the sending application, the sending application may fail or return errors, and the user experience may be degraded. Therefore, due to the non-deterministic nature of communications activities, conventional mobile platform elements may remain in a constant state of readiness to process network packets. This may lead to elevated power consumption for the overall mobile platform.

DETAILED DESCRIPTION

Figure 1:
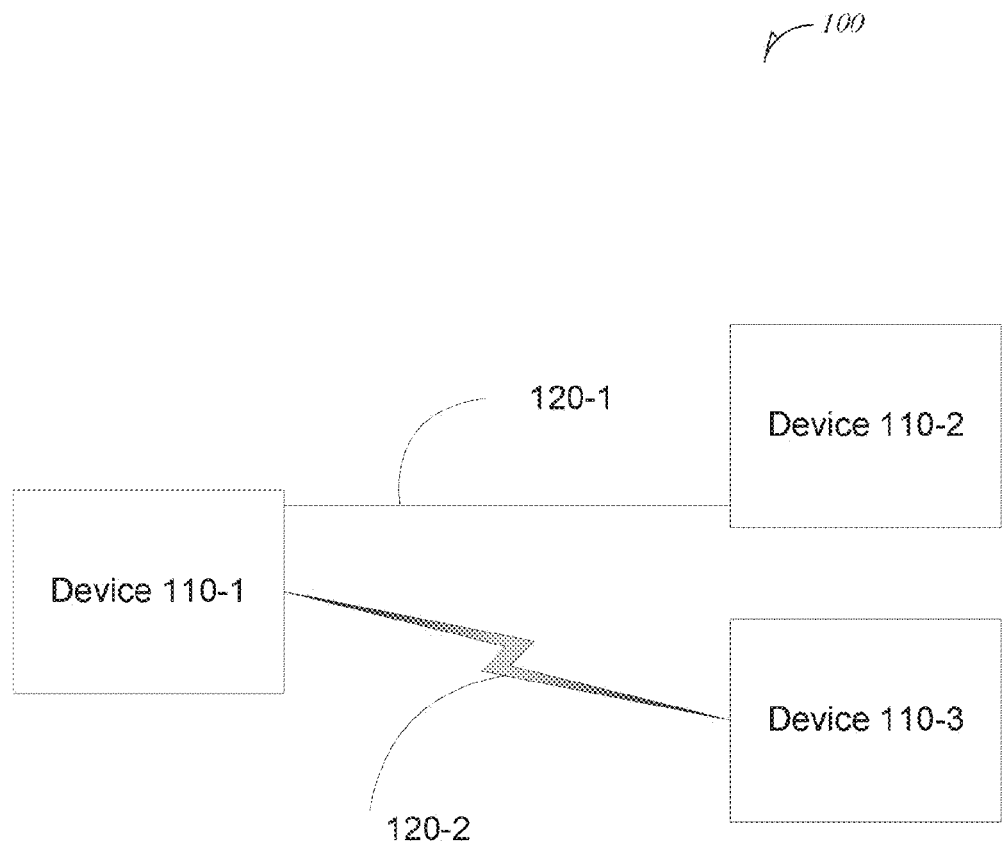
FIG. 1 is a diagram illustrating a network in which example embodiments may be implemented.

The following description is presented to enable any person skilled in the art to create and use a computer system configuration and related method and article of manufacture to optimize processing of semi-active workloads. In at least one embodiment, portions of the transmission control protocol (TCP) state machine are offloaded to a network interface card (NIC) to allow a processor to enter into or stay in a sleep state to reduce overall platform power consumption for a networked device.

In conventional systems, an operating system executing on a computer may initiate a network connection between a software application executing on the computer and a remote sender. The network connection may be, for example, a TCP connection, and the operating system may configure this connection by setting up a TCP socket. A NIC receives data packets over the TCP network connection and transfers them to the main memory of the computer. In conventional systems, a NIC may notify the operating system that the transfer has been completed by sending a direct memory access (DMA) interrupt for each packet, upon each data transfer.

In conventional systems, after receiving the interrupt, the operating system instructs the computer's processor, or CPU, to process the data packet and send a TCP acknowledge (ACK) message to the sender. In conventional systems, the NIC then forwards each ACK to the original sending application over the Ethernet or wireless connection. Such processing may require that the platform components of the computer remain awake (or come out of a low-power state if the platform components have already entered a low-power state), thus causing unnecessary or excessive power draws over the whole platform.

Some TCP optimization schemes may mitigate power draws by delaying and buffering the aforementioned data transfers, or by delaying interrupts to allow data to be processed as a burst. However, data transfer cannot be delayed over a certain amount of time without negatively impacting TCP optimization algorithms, because excessive delays unnecessarily increase round-trip time (RTT) estimates. RTT estimates are used by devices to help determine when TCP packets need to be retransmitted. If a packet has not been acknowledged in a certain amount of time (the RTT estimate), then the sender assumes that the packet was lost and the sender retransmits the packet. RTT estimates are set in such a way to optimize the throughput of the TCP connection while preventing lost data. If the RTT estimate is too high, and particularly when packet transmission errors occur (a common situation in wireless communication), the TCP connection may sit idle while waiting for the acknowledgement packet to arrive from the client machine. This creates inefficiencies on the connection and lowers the data throughput.

Example embodiments allow for the time between data transfers to be longer, thus leading to reduced power draws, without distorting timing metrics or creating inefficiencies in the TCP connection.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the broadest scope consistent with the principles and features disclosed herein.

FIG. 1 is a diagram illustrating a network 100 in which example embodiments may be implemented. Network 100 includes three devices 110-1, 110-2, and 110-3. However, it will be understood that any number of devices may be present. Network 100 may comprise, or form part of, a wired communications system, a wireless communications system, or any combination thereof. For example, device 110-1 may communicate with device 110-2 over wired connection 120-1. Wired connection 120-1 may be, for example, a wire, cable, bus, or Ethernet connection.

Further, device 110-1 may communicate with device 110-3 over a wireless connection 120-2. Wireless connection 120-2 may be, for example, a Wi-Fi connection or other type of radio frequency (RF) connection. Further, one or more devices of network 100 may be part of a cloud computing environment or other computer cluster-based environment for providing computer services to users. Connections 120-1 and 120-2 may operate using transmission control protocol (TCP) in at least one example embodiment. Devices 110-1 through 110-3 of network 100 may be any type of fixed or mobile electronic device or resource including, for example, a computer, a workstation, a laptop computer, a tablet computer, or a smartphone.

Figure 2:
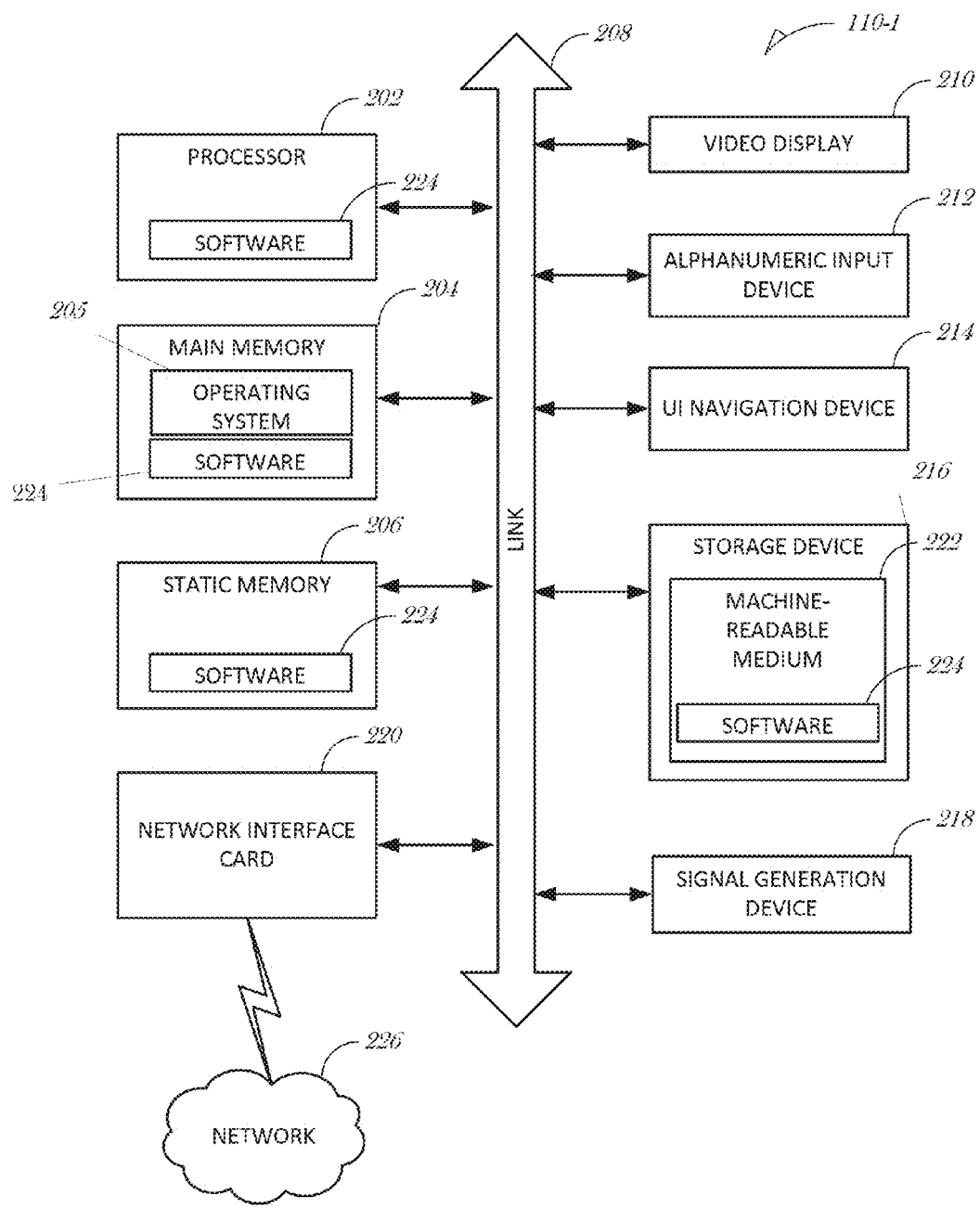
FIG. 2 is a block diagram illustrating a machine in the example form of a computer system, within which a set or sequence of instructions for causing the machine to perform any one of the methodologies discussed herein may be executed, according to an example embodiment.

While each of devices 110-1 through 110-3 may be one of many different types of networked devices, devices 110-1 through 110-3 may include certain common elements illustrated in FIG. 2. FIG. 2 is discussed below with respect to device 110-1; however, it will be understood that devices 110-2 and 110-3 may include the same or similar structure.

FIG. 2 is a block diagram illustrating a machine in the example form of a computer system (e.g., device 110-1), within which a set or sequence of instructions for causing the machine to perform any one of the methodologies discussed herein may be executed, according to an example embodiment. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example device 110-1 includes at least one processor 202 (e.g., a central processing unit (CPU), a graphics processing unit (GPU) or both, processor cores, compute nodes, etc.), main memory 204, and static memory 206, which communicate with each other via link 208 (e.g., bus). The at least one processor 202, main memory 204, and static memory 206 may be referred to hereinafter as a "host." Device 110-1 may further include video display unit 210, an alphanumeric input device 212 (e.g., a keyboard), and user interface (UI) navigation device 214 (e.g., a mouse). In an embodiment, video display unit 210, input device 212, and UI navigation device 214 are incorporated into a touch screen display. Device 110-1 may additionally include a storage device 216 (e.g., a drive unit), a signal generation device 218 (e.g., a speaker), a network interface card (NIC) 220, and one or more sensors (not shown), such as a global positioning system (GPS) sensor, compass, accelerometer, or other sensor.

Example embodiments allow a certain portion of the TCP state machine, in particular the responsibility for sending ACKs in response to data packets, to be offloaded from processor 202 to NIC 220 for a period of time, without the knowledge of the host's operating system. In other words, in example embodiments, no changes are required to the host operating system's protocol stack to allow offloading this responsibility from processor 202. The processor 202 may enter or stay in a sleep state while data transfer is happening without any loss of throughput because the received packets are acknowledged within the time expected by the sending application. Example embodiments, therefore, will not lead to an increased RTT estimate and concomitant lowered throughput.

Storage device 216 includes at least one machine-readable medium 222 on which is stored one or more sets of data structures and instructions 224 (e.g., software) embodying or utilized by any one or more of the methodologies or functions described herein. Instructions 224 may also reside, completely or at least partially, within main memory 204, static memory 206, and/or within processor 202 during execution thereof by device 110-1, with main memory 204, static memory 206, and processor 202 also constituting machine-readable media.

Main memory 204 further includes an operating system 205. Operating system 205 may be used, for example, to support the full TCP/IP protocol stack, including performing operations required by a standard TCP connection.

While machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Instructions for implementing software 224 may further be transmitted or received over a communications network 226 using a transmission medium via the NIC 220 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Figure 3:
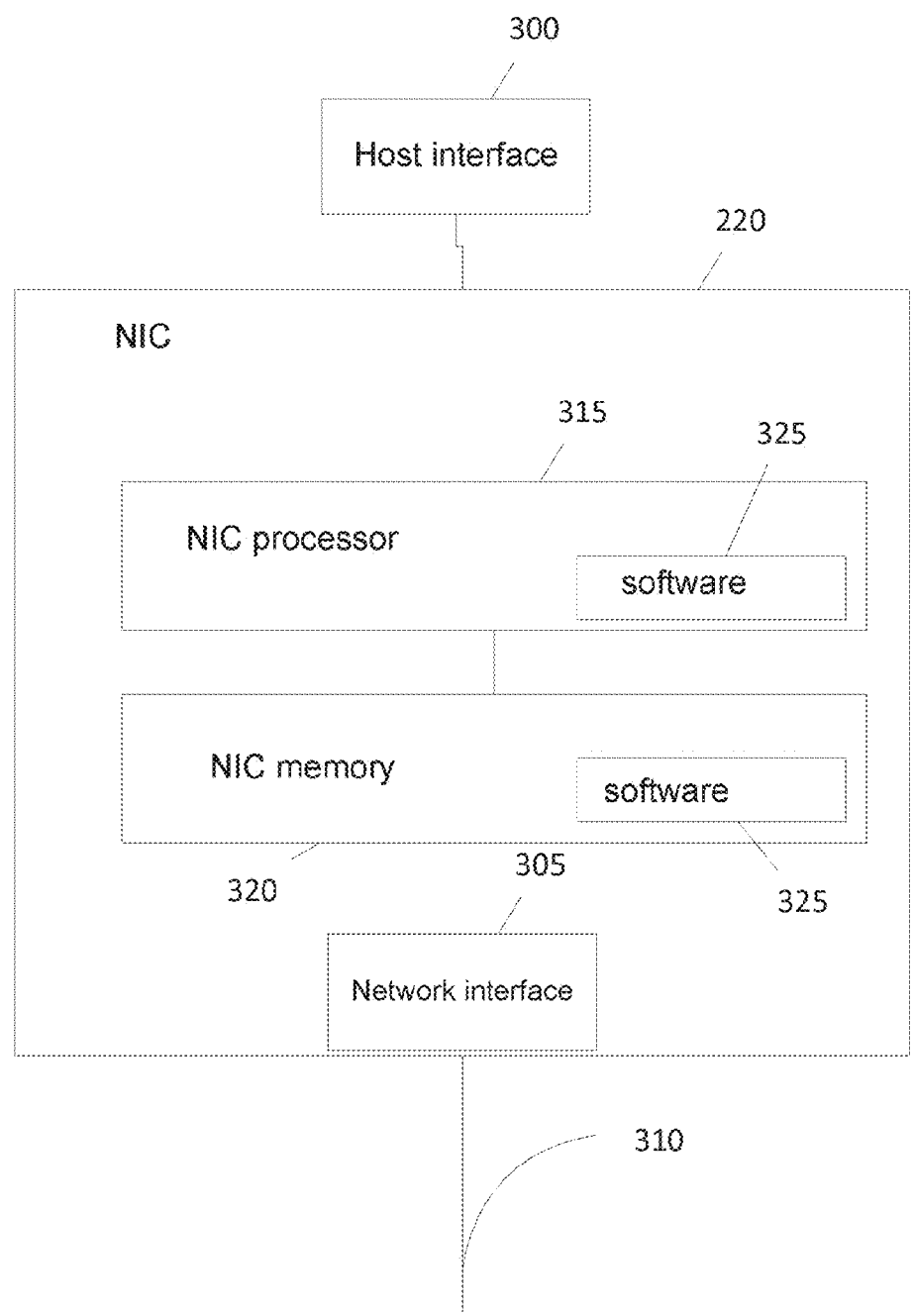
FIG. 3 is a block diagram illustrating a network interface card (NIC) in which example embodiments may be implemented, within which a set or sequence of instructions for causing the NIC to perform any of the methodologies discussed herein may be executed, according to an example embodiment.

FIG. 3 is a block diagram illustrating a network interface card (NIC) 220 in which example embodiments may be implemented, within which a set or sequence of instructions for causing the NIC to perform any of the methodologies discussed herein may be executed, according to an example embodiment. NIC 220 interfaces with processor 202 and main memory 204 (FIG. 2) through host interface 300. Host interface 300 may be, for example, a Peripheral Component Interconnect (PCI), PCI-X, PCI-Express, Industry Standard Architecture (ISA), or other type of bus. NIC 220 communicates using a network interface 305 over a network connection 310 to the external network 226 (FIG. 2). Network connection 310 may be a wired or wireless connection, for example a wireless local area network (WLAN) connected as supported by the Institute of Electrical and Electronics Engineers (IEEE) 802.11 standards.

NIC 220 may include NIC processor 315 and NIC memory 320. NIC processor 315 may communicate with NIC memory 320 to store, for example, data packets received over network connection 310 through network interface 305. Instructions 325 may also reside, completely or at least partially, within NIC processor 315 and NIC memory 320, during execution thereof by NIC 220, with NIC processor 315 and NIC memory 320 also constituting machine-readable media.

Network interface 305 may be configured to receive, during a time duration, a plurality of data packets from a sender. In example embodiments, the plurality of data packets comprises a stream. In example embodiments, the magnitude of the time duration may be specific to the data stream that incorporates the plurality of data packets. The magnitude of the time duration may reflect the amount of latency, for example a latency threshold that the data stream can tolerate. The latency threshold may be set by an application that generates the stream of data packets.

Either the software 224 that requested the TCP connection, or the operating system 205 (FIG. 2), informs the NIC processor 315 of the pertinent time duration for the stream incorporating the plurality of data packets. In an illustrative example, a data backup application may tolerate a 100-millisecond latency, whereas multimedia content may only tolerate a much lower latency as large latencies for multimedia applications may visibly detract from the user experience. The time duration for receiving a batch of packets for a data backup application, therefore, may be much longer than the time duration for receiving multimedia content. In other example embodiments, the time duration may be based on, for example, the number of bytes received, or the number of transfers that have taken place between the NIC 220 and the main memory 204 (FIG. 2).

In at least one embodiment, the plurality of data packets is received over network connection 310. NIC processor 315 inspects an identifier for the received packet. For example, NIC processor 315 may determine if the stream of data packets should be subjected to the TCP offload according to example embodiments based on a TCP socket identifier. In at least one embodiment, the TCP socket identifier is a tuple. In at least one embodiment, the tuple is a 5-tuple for identifying whether the stream of packets should be subjected to TCP offload, and further identifying source and destination IP addresses and port numbers for TCP socket pairs.

In at least one embodiment, the software 224 (FIG. 2) that requested initiation of the TCP connection sets the TCP socket identifier to indicate that a stream is selected for offload. In at least another embodiment, operating system 205 (FIG. 2) indicates that a stream is selected for offload by setting the TCP socket identifier in a TCP socket application programming interface (API) call to the remote sender. If the TCP socket identifier does not indicate that the stream is selected for offload, then methods according to example embodiments are not implemented, and the stream is processed according to conventional methods.

Throughout the time duration, network interface 305 may be configured to transmit, over network connection 310, acknowledgements of the plurality of data packets. The acknowledgements may be for example, TCP ACK messages as expected by the sender according to the TCP protocol. The TCP ACK message includes an appropriate sequence number expected by the sender, which is derived from the received packet header and the initial TCP socket connection establishment.

During the time duration, NIC processor 315 may be configured to store the plurality of data packets in NIC memory 320. If a predetermined buffer threshold for NIC memory 320 has been reached, NIC processor 315 transfers the contents of NIC memory 320 to main memory 204 (FIG. 2) via direct memory access (DMA) but without generating any interrupt, so that the host processor 202 (FIG. 2) and other host components may remain in a low-power state if they have entered a low-power state.

Subsequent to the time duration, upon reaching the latency threshold pertaining to the data stream, host interface 300 may be configured to transmit a signal, for example an interrupt, to trigger the host processor 202 to batch process the plurality of data packets stored in main memory 204. Host interface 300 may further be configured to receive, from the host processor 202, a value corresponding to a data packet of the plurality of data packets. Network interface 305 may be configured to use this value to transmit an acknowledgement of the next data packet received after the time duration. This value may correspond to the last data packet received from the sender during the time duration. The value may be a sequence number of the last data packet received during the time duration.

Subsequent to the time duration, host interface 300 may be configured to receive acknowledgements, from host operating system 205, for the data packets that were received from the sender during the time duration. For example, when host processor 202 and other host components wake from a low-power state after completion of the latency period, host interface 300 may receive TCP ACK messages from host operating system 205 for all of the data packets that were received during the time duration. NIC processor 315 may be configured to disregard these received ACKs and therefore the NIC processor 315 does not request that these ACKs be passed to the remote sender, in order to avoid transmitting duplicate ACKS to the remote sender. However, the NIC processor 315 uses the sequence number of the ACK corresponding to the last data packet processed by host processor 202 in order to acknowledge, with an ACK packet, the first incoming data packet in the next set of data packets. Based on the received ACK packet and the sequence number in the ACK packet, the sender may scale the TCP window size according to the sender's implementation of a TCP flow algorithm. According to an example implementation of the TCP flow algorithm, the sender may note that the sequence number is not the expected sequence number, indicating possible lost data packets, and the sender may therefore decrease the TCP window size to prevent, for example, memory buffer overruns that may cause packets to be missed or dropped. If the sequence number is the expected sequence number, the sender may increase the TCP window size in order to more efficiently use network bandwidth. However, the sender may not increase the TCP window size over the window size advertised for the device 110-1 within the ACK packet. The rate at which the sender increases or decreases the window size may depend on various implementations of TCP by different devices in network 100.

If NIC 220 receives a packet that NIC 220 is unable to handle (e.g., the packet is missing a sequence number, the sequence number is incorrect, the packet checksum is incorrect, or the packet is not of the expected protocol type), or the NIC processor 315 detects that the socket identifier includes flags indicating that special processing is required, NIC processor 315 will not send an ACK back to the sender over network interface 305 and network connection 310. Instead, NIC processor 315 will cause to be transmitted, through host interface 300, a DMA interrupt to be transmitted to host operating system 224, through host interface 300, to wake the host processor 202 and to trigger host processor 202 to process the packet as soon as possible.

Figure 4:
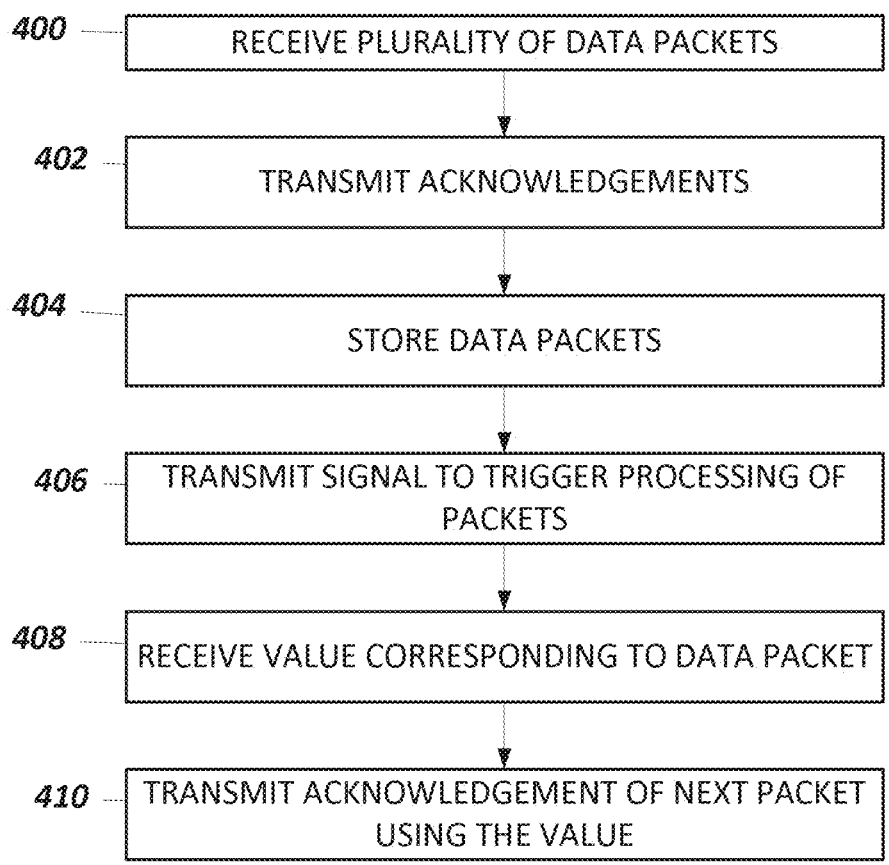
FIG. 4 is a flowchart illustrating a method for optimizing power in the presence of semi-active workloads according to at least one example embodiment.

FIG. 4 is a flowchart illustrating a method for optimizing power in the presence of semi-active workloads according to at least one example embodiment. At block 400, a plurality of data packets is received during a time duration from a remote sender. In an embodiment, the plurality of data packets is received by a network interface device. In an embodiment, the plurality of data packets comprises a stream, and the time duration corresponds to a latency threshold of the stream. In an embodiment, the latency threshold is set by an application that generates the stream. The time duration may be determined as described above with respect to FIG. 3. The data packets may be received over a TCP socket initiated as described above with respect to FIG. 3. In an embodiment, the packets may be buffered at the NIC memory 320.

At block 402, acknowledgements of the plurality of data packets are transmitted during the time duration to the remote sender. In an embodiment, the acknowledgements may be transmitted by the network interface device according to the transmission control protocol (TCP).

At block 404, the plurality of data packets is stored. In an embodiment, at least one of the data packets are buffered in a first buffer and transferred to a second buffer when a buffer threshold of the first buffer is reached, such as, for example described above with respect to FIG. 3. In an embodiment, the first buffer is incorporated into the network interface device.

At block 406, subsequent to the time duration, a signal is transmitted to trigger processing of the plurality of data packets received during the time duration. In an example embodiment, the signal may be an interrupt signal transmitted over a host interface 300 as described above with respect to FIG. 3.

At block 408, subsequent to the time duration, a value is received. The value corresponds to a data packet of the plurality of data packets received during the time duration. In an embodiment, the value corresponds to a sequence number of a last data packet received during the time duration.

At block 410, subsequent to the time duration, an acknowledgement of a next data packet is transmitted to the remote sender. The acknowledgement uses the value received at block 408.

In an embodiment, the method may further include receiving, subsequent to the time duration, acknowledgements for the plurality of data packets received during the time duration. The acknowledgements may be received from a processor that is communicatively coupled to the network interface device. The method may further include disregarding, without transmitting, these acknowledgements.

In an embodiment, the method may further include detecting a flag value in the plurality of data packets and waking a second device to handle processing of the plurality of data packets based on the detection.

The above-described example embodiments provide a significant reduction in the CPU core utilization required to maintain networked connections, for example TCP connections, between networked devices. Conventional systems require that the host computer remain responsible for sending expected handshaking messages, for example TCP ACK messages, in order that network connections remain active and usable. Example embodiments offload the responsibility of sending the expected handshaking messages to a NIC card, allowing for an increased idle interval between CPU wake events and a reduction in power requirements for the overall host computer platform.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Additional Notes and Examples

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 includes a network interface device comprising: a network interface module configured to receive, during a time duration, a plurality of data packets from a sender and transmit, during the time duration, acknowledgements of the plurality of data packets to the sender; a processor configured to store the plurality of data packets in a first buffer; and a host interface module configured to transmit, subsequent to the time duration, a signal to trigger processing of the plurality of data packets and to receive, subsequent to the time duration, a value corresponding to a data packet of the plurality of data packets received during the time duration, the network interface module being further configured to transmit, subsequent to the time duration and using the value, an acknowledgement of a next data packet received from the sender.

In Example 2, the subject matter of Example 1 can optionally include a host interface module further configured to receive, subsequent to the time duration and from a second processor communicatively coupled to the network interface device, acknowledgements for the plurality of data packets received from the sender during the time duration; and a processor further configured to disregard, without retransmitting to the sender, the acknowledgements received by the host interface module.

In Example 3, the subject matter of either Example 1 or 2 can optionally include, a processor further configured to: buffer at least one of the plurality of data packets in a first memory; and transfer at least one of the plurality of data packets to a second memory associated with a processor communicatively coupled to the network interface device when a buffer threshold of the first memory is reached.

In Example 4 the subject matter of one or any combination of Examples 1-3 can optionally include wherein the acknowledgements are transmitted to the sender according to the transmission control protocol (TCP).

In Example 5, the subject matter of one or any combination of Examples 1-4 can optionally include wherein the plurality of data packets comprise a stream; the time duration corresponds to a latency threshold of the stream; and the latency threshold is set by an application that generates the stream.

In Example 6, the subject matter of one or any combination of Examples 1-5 can optionally include wherein the value corresponds to a last data packet received from the sender during the time duration.

In Example 7, the subject matter of one or any combination of Examples 1-6 can optionally include wherein the value is a sequence number of the last data packet received during the time duration.

In Example 8, the subject matter of one or any combination of Examples 1-7 can optionally include wherein the processor is further configured to: detect a flag value in at least one of the plurality of data packets; wake a processor that is communicatively coupled to the network interface device; and trigger the processor that is communicatively coupled to the network interface device to process the plurality of data packets based on detecting the flag value.

Example 9 can include, or can optionally be combined with the subject matter of one or any combination of Examples 1-8 to include a device, comprising: a processor configured to operate in a sleep mode and an active mode; a first buffer; and a network interface card (NIC), the NIC to: receive, during a time duration, a plurality of data packets, the time duration being determined by at least one of an operating system and a software application executing on the processor; transmit, during the time duration, acknowledgements of the plurality of data packets; store the plurality of data packets in the first buffer; transmit, to the processor and subsequent to the time duration, a signal to trigger the processor to process the plurality of data packets; receive, from the processor and subsequent to the time duration, a value corresponding to a data packet of the plurality of data packets received during the time duration; and transmit, subsequent to the time duration and using the value, an acknowledgement of a next packet; wherein the device is configured to maintain the processor in the sleep mode for at least a portion of the time duration.

In Example 10, the subject matter of Example 9 can optionally include wherein the NIC is further configured to: receive, from the processor and subsequent to the time duration, acknowledgements for the plurality of data packets received during the time duration; and disregard, without retransmitting, the acknowledgements received from the processor.

In Example 11, the subject matter of one or any combination of Examples 9-10 can optionally include wherein: the plurality of data packets comprise a stream; the time duration corresponds to a latency threshold of the stream; and the latency threshold is set by an application that generates the stream.

In Example 12, the subject matter of one or any combination of Examples 9-11 can optionally include wherein the device further includes a second buffer, the second buffer being associated with the NIC; and the NIC is further configured to: buffer at least one of the plurality of data packets in the second buffer; and transfer at least one of the plurality of data packets from the second buffer to the first buffer when a threshold of the second buffer is reached.

In Example 13, the subject matter of one or any combination of Examples 9-12 can optionally include wherein the NIC is further configured to: detect a flag value in the plurality of data packets; wake the processor; and transmit a signal to trigger the processor to process the plurality of data packets based on detecting the flag value.

Example 14 can include, or can optionally be combined with the subject matter of one or any combination of Examples 1-13 to include a machine-readable storage medium including instructions, which when executed by a machine, cause the machine to: receive, by a network interface device during a time duration, from a remote sender, a plurality of data packets; transmit, during the time duration, to the remote sender, acknowledgements of the plurality of data packets; store, the plurality of data packets received during the time duration; transmit, subsequent to the time duration, a signal to trigger processing of the plurality of data packets received during the time duration; receive, subsequent to the time duration, a value corresponding to a data packet of the plurality of data packets received during the time duration; and transmit, to the remote sender subsequent to the time duration and using the value, an acknowledgement of a next data packet.

In Example 15, the subject matter of Example 14 can optionally include receiving, by the network interface device subsequent to the time duration and from a processor communicatively coupled to the network interface device, acknowledgements for the plurality of data packets received during the time duration; and disregarding, without re-transmitting to the remote sender, the received acknowledgments.

In Example 16, the subject matter of one or any combination of Examples 14-15 can optionally include instructions further causing the machine to: buffer at least one of the plurality of data packets in a first buffer; and transfer the at least one of the plurality of data packets to a second buffer when a buffer threshold of the first buffer is reached.

In Example 17, the subject matter of one or any combination of Examples 14-16 can optionally include wherein the acknowledgements are transmitted according to the transmission control protocol (TCP).

In Example 18, the subject matter of one or any combination of Examples 14-17 can optionally include wherein the plurality of data packets comprise a stream; the time duration corresponds to a latency threshold of the stream; and the latency threshold is set by an application that generates the stream.

In Example 19, the subject matter of one or any combination of Examples 14-18 can optionally include wherein the value corresponds to a sequence number of a last data packet received during the time duration.

In Example 20, the subject matter of one or any combination of Examples 14-19 can optionally include the instructions further causing the machine to: detect a flag value in the plurality of data packets; and wake a second device to handle processing of the plurality of data packets based on the detecting.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, one instantiation of a module may not exist simultaneously with another instantiation of the same or different module. For example, where the modules comprise a general-purpose hardware processor configured using software, the general-purpose hardware processor can be configured as respective different modules at different times. Accordingly, software can configure a hardware processor, for example, to constitute a particular module at one instance of time and to constitute a different module at a different instance of time.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract of the Disclosure is provided to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A network interface device comprising:
a network interface module configured to receive, during a time duration for which a host processor is in a sleep mode, a plurality of data packets from a sender, wherein the plurality of data packets comprise a stream, and transmit, during the time duration, acknowledgements of the plurality of data packets to the sender, wherein the host processor is communicatively coupled to the network interface module and wherein at least one of an operating system and a user software application is executed on the host processor, and wherein the time duration corresponds to a latency threshold of the stream;
a network interface card (NIC) processor configured to store the plurality of data packets in a first buffer; and
a host interface module configured to transmit, subsequent to the time duration, a signal to trigger processing of the plurality of data packets and to receive, subsequent to the time duration, a value corresponding to a data packet of the plurality of data packets received during the time duration, wherein the value corresponds to the sequence number of the last packet received during the time duration, the network interface module being further configured to transmit, subsequent to the time duration and using the value, an acknowledgement of a next data packet received from the sender.

2. The network interface device of claim 1, wherein:
the host interface module is further configured to receive, subsequent to the time duration and from the host processor, acknowledgements for the plurality of data packets received from the sender during the time duration; and
the NIC processor is further configured to disregard, without retransmitting to the sender, the acknowledgements received by the host interface module.

3. The network interface device of claim 1, wherein the NIC processor is further configured to:
buffer at least one of the plurality of data packets in a first memory; and
transfer at least one of the plurality of data packets to a second memory associated with the host processor when a buffer threshold of the first memory is reached.

4. The network interface device of claim 1, wherein the acknowledgements are transmitted to the sender according to the transmission control protocol (TCP).

5. The network interface device of claim 1, wherein the latency threshold is set by an application that generates the stream.

6. The network interface device of claim 1, wherein the NIC processor is further configured to:
detect a flag value in at least one of the plurality of data packets;
wake the host processor; and
trigger the host processor to process the plurality of data packets based on detecting the flag value.

7. A device, comprising:
a host processor configured to operate in a sleep mode and an active mode;
a first buffer; and
a network interface card (NIC), the NIC configured to:
receive, during a time duration for which the host processor is in a sleep mode, a plurality of data packets, wherein the plurality of data packets comprise a stream, wherein the time duration corresponds to a latency threshold of the stream;
transmit, during the time duration, acknowledgements of the plurality of data packets;
store the plurality of data packets in the first buffer;
transmit, to the host processor and subsequent to the time duration, a signal to trigger the host processor to process the plurality of data packets;
receive, from the host processor and subsequent to the time duration, a value corresponding to a data packet of the plurality of data packets wherein the value corresponds to the sequence number of the last packet received during the time duration; and
transmit, subsequent to the time duration and using the value, an acknowledgement of a next packet;
wherein the device is configured to maintain the host processor in the sleep mode for at least a portion of the time duration.

8. The device of claim 7, wherein the NIC is further configured to:
receive, from the host processor and subsequent to the time duration, acknowledgements for the plurality of data packets received during the time duration; and
disregard, without retransmitting, the acknowledgements received from the host processor.

9. The device of claim 7, wherein:
the latency threshold is set by an application that generates the stream.

10. The device of claim 7, wherein the device further includes a second buffer, the second buffer being associated with the NIC; and
the NIC is further configured to:
buffer at least one of the plurality of data packets in the second buffer; and
transfer at least one of the plurality of data packets from the second buffer to the first buffer when a threshold of the second buffer is reached.

11. The device of claim 7, wherein the NIC is further configured to:
detect a flag value in the plurality of data packets;
wake the host processor; and
transmit a signal to trigger the host processor to process the plurality of data packets based on detecting the flag value.

12. A non-transitory machine-readable storage medium including instructions, which when executed by a machine, cause the machine to:
receive, by a network interface device during a time duration for which a host processor communicatively coupled to the network interface device and on which is executed at least one of an operating system and a user software application, is in a sleep mode, from a remote sender, a plurality of data packets, wherein the plurality of data packets comprise a stream, and wherein the time duration corresponds to a latency threshold of the stream;
transmit, by the network interface device and during the time duration, to the remote sender, acknowledgements of the plurality of data packets;
store, on a processor of the network interface device, the plurality of data packets received during the time duration;
transmit, subsequent to the time duration, a signal to trigger processing of the plurality of data packets received during the time duration;
receive, subsequent to the time duration, a value corresponding to a data packet of the plurality of data packets received during the time duration, wherein the value corresponds to the sequence number of the last packet received during the time duration; and
transmit, to the remote sender subsequent to the time duration and using the value, an acknowledgement of a next data packet.

13. The machine-readable storage medium of claim 12, the instructions further causing the machine to:
receive, by the network interface device subsequent to the time duration and from the host processor, acknowledgements for the plurality of data packets received during the time duration; and
disregard, without re-transmitting to the remote sender, the received acknowledgments.

14. The machine-readable storage medium of claim 12, the instructions further causing the machine to:
buffer at least one of the plurality of data packets in a first buffer; and
transfer the at least one of the plurality of data packets to a second buffer when a buffer threshold of the first buffer is reached.

15. The machine-readable storage medium of claim 12, wherein the acknowledgements are transmitted according to the transmission control protocol (TCP).

16. The machine-readable storage medium of claim 12, wherein:
the latency threshold is set by an application that generates the stream.

17. The machine-readable storage medium of claim 12, the instructions further causing the machine to:
detect a flag value in the plurality of data packets; and
wake a second device to handle processing of the plurality of data packets based on the detecting.

* * * * *